US011832719B2

United States Patent
DeVries et al.

(10) Patent No.: US 11,832,719 B2
(45) Date of Patent: *Dec. 5, 2023

(54) TABLE WITH REMOVABLE LEGS

(71) Applicant: Exemplis LLC, Cypress, CA (US)

(72) Inventors: Paul DeVries, Huntington Beach, CA (US); Peter Jeffery, Huntington Beach, CA (US); Shane Schaffer, Huntington Beach, CA (US); Ryan Dibble, Irvine, CA (US)

(73) Assignee: Exemplis LLC, Cypress, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/048,992

(22) Filed: Oct. 24, 2022

(65) Prior Publication Data

US 2023/0136673 A1 May 4, 2023

Related U.S. Application Data

(63) Continuation of application No. 17/444,120, filed on Jul. 30, 2021, now Pat. No. 11,478,073.

(60) Provisional application No. 63/094,282, filed on Oct. 20, 2020.

(51) Int. Cl.
A47B 13/00 (2006.01)
(52) U.S. Cl.
CPC ...... *A47B 13/003* (2013.01); *A47B 2013/006* (2013.01)
(58) Field of Classification Search
CPC .......... A47B 2013/006; A47B 2013/06; A47B 13/003
See application file for complete search history.

(56) References Cited

U.S. PATENT DOCUMENTS

| 1,539,112 | A | | 5/1925 | Gloekler |
| 2,362,567 | A | | 11/1944 | La Rue |
| 2,606,802 | A | | 8/1952 | Inpyn |
| 2,736,626 | A | | 2/1956 | Inpyn |
| 2,911,273 | A | | 11/1959 | Inpyn |
| 3,063,765 | A | | 11/1962 | Huff |
| 3,309,051 | A | | 3/1967 | Pina |
| 3,443,530 | A | | 5/1969 | Carlson |
| 4,011,821 | A | | 3/1977 | Neal |
| 4,199,124 | A | | 4/1980 | Tachida |
| 6,016,756 | A | * | 1/2000 | McMahon ............ A47B 13/021 108/158 |
| 6,629,506 | B2 | * | 10/2003 | Park ..................... A47B 91/024 248/188 |

(Continued)

FOREIGN PATENT DOCUMENTS

| GB | 0797249 A | 6/1958 |
| KR | 10-0783196 B1 | 12/2007 |
| WO | 2018/215815 A1 | 11/2018 |

*Primary Examiner* — Daniel J Rohrhoff
(74) *Attorney, Agent, or Firm* — Villamar & Guiliana LLP

(57) ABSTRACT

A furniture assembly can include a tabletop with removable legs. The removable legs can be attached to the tabletop with a socket having a threaded member mounted in a non-fixed and anti-rotation registration at the bottom of the socket. The legs can be mounted to the socket by insertion and turning for threaded engagement. The floating engagement mechanism can allow the threaded fastener member to move during installation to provide for enhanced alignability between the leg and the threaded fastener member.

20 Claims, 10 Drawing Sheets

(56) References Cited

U.S. PATENT DOCUMENTS

| | | | |
|---|---|---|---|
| 6,776,380 B1 | 8/2004 | Kirk et al. | |
| 7,588,218 B2 * | 9/2009 | Kim | A47B 91/024 248/188.4 |
| 8,079,314 B2 * | 12/2011 | MacLean | A47B 13/021 108/155 |
| 9,220,337 B1 | 12/2015 | Wenzel | |
| 9,995,328 B2 | 6/2018 | Gregory | |
| 11,051,617 B2 * | 7/2021 | Cheng | A47B 91/024 |
| 11,478,073 B2 * | 10/2022 | DeVries | F16B 12/44 |
| 2007/0209561 A1 * | 9/2007 | Hsieh | A47B 3/06 108/156 |
| 2009/0140110 A1 * | 6/2009 | Saffell | F16B 12/42 248/188 |
| 2016/0003276 A1 * | 1/2016 | Møller Hansen | A47B 95/00 403/116 |
| 2017/0245640 A1 * | 8/2017 | Cheng | A47B 91/022 |
| 2018/0001466 A1 * | 1/2018 | Brunner | A47B 3/12 |
| 2022/0142355 A1 * | 5/2022 | Neltner | A47B 13/003 |
| 2022/0265053 A1 * | 8/2022 | Putnam | A47B 13/003 |

\* cited by examiner ics to furniture, including tables and desks. Such types

TABLE WITH REMOVABLE LEGS

INCORPORATION BY REFERENCE TO ANY PRIORITY APPLICATIONS

This application is a Continuation application of U.S. patent application Ser. No. 17/444,120 filed Jul. 30, 2021, which also claims the benefit of U.S. Patent Provisional Application No. 63/094,282, filed Oct. 20, 2020, the entire contents of which are hereby expressly incorporated by reference herein in their entirety and for all purposes. In addition, any and all applications for which a foreign or domestic priority claim is identified in the Application Data Sheet as filed with the present application are hereby incorporated by reference under 37 CFR 1.57.

BACKGROUND OF THE INVENTIONS

Field of the Inventions

The embodiments disclosed herein relate to tables or other pieces of furniture with removable legs, including desks with legs that can be removed for shipping.

Description of the Related Art

Various different designs exist for removably mounting legs to furniture, including tables and desks. Such types furniture are usually supported by a plurality of legs resting on the floor, to support an upright support surface, such as top of a table or desk, in a stable manner. In some applications, such as heavier weight furniture or musical instruments, legs can be inclined relative to vertical, to better support the higher weight in a more stable manner.

Generally, it is easier to securely attach a leg to a piece of furniture with high rigidity and durability, if it is attached in a permanent manner, for example, as part of the manufacturing process. However, permanently attached legs result in a larger volumetric space which can significantly increase shipping charges.

SUMMARY OF THE INVENTIONS

An aspect of at least one of the inventions disclosed herein includes the realization that a leg mounting socket for a piece of furniture configured for removable and secured engagement of a support leg to a piece of furniture with at least one of two threaded fastener portions being mounted for limited relative motion can generate a highly stable and secure connection between the leg and the socket, reduce structural loads on the threaded fasteners at portions, and at the same time, provide improved alignability of the threaded fastener portions within the socket. For example, some known designs for a leg mounting socket include a cylindrical socket portion with a bolt rigidly fixed at the center of the bottom of the cylindrical portion. A threaded nut is fixed to the end of the leg. With both portions of the fastener, the bolt and the nut, secured in fixed locations and orientations relative to the socket and the leg, respectively, a collimation problem arises. The collimation problem is due to the need to be able to align the bolt and the nut as well as the socket in the outer surface of the leg, with sufficient accuracy that the threads on the bolt and the nut can engage. It is beneficial for the inner surface of the socket to be close fitting with the outer surface of the leg, so as to transfer loads from the leg to walls of the socket for a more stable connection and load transfer from the leg to the socket. However, a close fit between the inner walls of the socket and the outer surface of the leg also make it more difficult to achieve accurate collimation between the bolt and the nut. Along these lines, any misalignment of the bolt and/or nut can result in additional loads and potential plastic deformation of the bolt or of the material forming the fixed connection, such as adhesive or weld.

For example, if the bolt is welded or fixed in place in the socket, but slightly misaligned, then as the nut of the leg is engaged with the bolt and screwed to a desired tightness, the bolt can be shifted or bent into a more accurate alignment. However, this shifting or bending can cause plastic deformation of the bolt itself and/or weaken the connection between the bolt and the socket. Further, as the leg is loaded in use, for example, due to lateral loads, such loads can be imparted onto the connection between the bolt and the socket, thereby potentially causing additional plastic deformation and/or damage to the connection between the bolt and the socket. These loads are in addition to the tensile load generated between the bolt and the nut which is generated by screwing the leg into the socket for a stable connection. This combination of loads can result in further plastic deformation or damage to the connection between the bolt and the socket.

An aspect of at least one of the inventions disclosed herein includes the realization that in a removable leg attachment mechanism having a socket and a leg, each of which include a threaded fastener portion, at least one of the threaded fastener portions can be secured to the socket or the leg with a non-fixed device, such that the at least one threaded fastener portion can move in a limited manner, with respect to the alignment of the two fastener portions. For example, but without limitation, a bolt can be connected to a bottom wall of the socket such that the bolt is captured at the bottom wall of the socket, but also allowed to pivot and/or twist slightly. For example, in some embodiments, a socket of such a system can include a square or a flat sided aperture at a bottom wall of the socket with a bolt extending through the flat sided aperture such that the bolt is registered with the flat sided aperture to prevent rotation, i.e., anti-rotation registration. Additionally, the aperture can be slightly larger than the outer flat surfaces of the bolt so as to provide some play between the bottom of the socket and the bolt. Additionally, a locking clip or other member can be provided on the bolt such that the bolt is captured within the aperture by the head of the bolt and the clip. The amount of play allowed by the clip and the bolt can be adjusted as desired, by adjusting the placement of the clip on the bolt and/or the relative clearance between the flat sided aperture and the flat surfaces of the bolt.

The corresponding leg can include a nut in the end of the leg, for example, aligned with the center axis of the leg. The outer surface of the leg can be closely matched, diametrically, with the inner surface of the socket. For example, the outer surface of the leg can be sized so as to provide a close and/or tight fit with the inner surface of the socket.

When the leg is inserted into the socket, the contact between the outer surface of the leg and the inner surface of the socket would tend to dominate the alignment there between, and thus control the alignment between the threads on the bolt and the threads on the nut. Because the bolt is mounted so as to be slightly moveable, the threads between the bolt and the nut can be more easily aligned for initiation of engagement of the threads. Further twisting of the leg and the anti-rotation registration between the bolt and the socket allows the nut and the bolt to become threadedly engaged and pull the socket and leg together, until a stop is reached.

For example, a portion of the leg could reach the bottom of the socket, thereby providing a positive engagement between the leg and the socket.

With the leg securely seated into the socket, and the close fit between the outer surface of the leg and the inner surface of the socket, much of the loads imparted onto the leg, and in particular, lateral loads and bending, would be imparted onto the socket. However, because the bolt is mounted within an aperture with clearance, and without being permanently affixed to the bottom wall of the socket, bending loads and elastic deformation of the socket would generate less load at the bolt. Thus, such a design can reduce or avoid additional loading of the bolt and/or nut and thus reduce or avoid plastic deformation and damage to the bolts that might be caused by collimation problems. As such, the detachable leg arrangement can be easier to assemble and more durable.

Thus, in some embodiments a desk kit with removable legs configured to efficient packaging and shipping, the kit can comprise a desktop having an upper surface configured as a working surface for a user and a lower surface having at least first, second, third, and fourth recesses configured for receiving leg mount components. First, second, third and fourth leg mounts can comprise a flange portion having a mounting surface, a projection extending from beyond the mounting surface and into one of the first, second, third, and fourth recesses, a socket portion having an inner side surface an end wall, a fastener aperture in the end wall, the fastener aperture comprising a plurality of inwardly facing flat surfaces configured for anti-rotation registration. First, second, third and fourth bolts can be coupled with the first, second, third and fourth leg mounts, respectively, each of the first, second, third and fourth bolts comprising a head, a shaft portion extending from the head, and a threaded portion extending from the shaft portion, the shaft portion comprising a plurality of outwardly facing flat surfaces configured to contact the inwardly facing flat surfaces and thereby engage the fastener aperture with anti-rotation registration, wherein the shaft portion is smaller than the fastener aperture so as to define a radial clearance between the shaft portion and the fastener aperture. First, second, third and fourth retainer clips can be engaged with the first, second, third and fourth bolts, respectively, the retainer clips being engaged with the threaded portions thereby capturing the end wall between the heads and the retainer clips with axial clearance, thereby retaining the outwardly facing flat surfaces of the bolts in alignment in the inward facing flat surfaces of the fastener apertures and thereby providing anti-rotation registration of the bolts within the fastener apertures. First, second, third and fourth legs can be attached to the first, second, third and fourth leg mounts, respectively, each of the first, second, third and fourth legs comprising a protruding portion having a leg outer surface sized to provide a snug fit with the inner side surface of the socket, a threaded aperture fixed to the protruding portion and configured to engage the threaded portion, a tapered aperture portion defining a tapered entrance to the threaded aperture. The radial and axial clearances can allow the bolts to move over limited ranges of radial and/or axial movement during installation to improve alignability of the threaded portions of the threaded apertures of the protruding portion.

In some embodiments, the socket portion extends at an inclined angle relative to the flange portion, and wherein the end wall is spaced from a plane of the mounting surface of the flange providing clearance between the head and lower surface of the desktop to allow the head to move during an alignment of the threaded portions with the threaded apertures.

In some embodiments, the projection comprises the head and the head extends into one of the first, second, third, and fourth recesses to provide clearance for the head to move during an alignment of the threaded portions with the threaded apertures.

In another embodiment, a table kit with removable legs can comprise a tabletop having an upper surface configured as a working surface for a user and a lower surface. At least a first leg mount can be connected to the lower surface of the tabletop and can comprise a flange portion having a mounting surface, a socket portion having an inner side surface an end wall, and a fastener aperture in the end wall, the fastener aperture comprising at least one inwardly facing flat surface configured for anti-rotation registration. At least a first bolt can be coupled with the first leg mount, the first bolt comprising a head, a shaft portion extending from the head, and a threaded portion extending from the shaft portion, the shaft portion comprising at least a first outwardly facing flat surface configured to contact the at least one inwardly facing flat surface and thereby engage the fastener aperture with anti-rotation registration, wherein the shaft portion is smaller than the fastener aperture so as to define a radial clearance between the shaft portion and the fastener aperture. At least a first retainer clip can be engaged with the first bolt, the retainer clips being engaged with the threaded portion thereby capturing the end wall between the head and the retainer clip with axial clearance. Additionally, at least a first leg can be configured to be attachable to the first leg mount and can comprise a protruding portion having a threaded aperture fixed to the protruding portion and configured to engage the threaded portion.

In some embodiments, the socket portion extends at an inclined angle relative to the flange portion, and wherein the end wall is spaced from a plane of the mounting surface of the flange providing clearance between the head and lower surface of the tabletop to allow the head to move during an alignment of the threaded portions with the threaded apertures.

In some embodiments, the projection comprises the head and the head extends into one the first recess to provide clearance for the head to move during an alignment of the threaded portion with the threaded aperture.

In some embodiments, the lower surface comprises at least a first recess, and wherein the first leg mount comprises a projection extending from beyond the mounting surface and into the first recesses.

In some embodiments, the first clip retains the first outwardly facing flat surface in alignment in the at least one inwardly facing flat surface of the fastener aperture, thereby providing anti-rotation registration of the bolt within the fastener aperture.

In some embodiments, the protruding portion comprises a leg outer surface sized to provide a snug fit with the inner side surface of the socket.

In some embodiments, a tapered aperture portion can define a tapered entrance to the threaded aperture.

In some embodiments, the radial and axial clearances allow the bolts to move over limited ranges of radial and/or axial movement during installation to improve alignability of the threaded portions of the threaded apertures of the protruding portion.

In yet another embodiment, a furniture kit with removable legs can comprise a structural furniture member, at least a first leg mount attached to the structural furniture member, a socket portion having an inner side surface an end wall, and a fastener aperture in the end wall, at least a first threaded fastener coupled with the leg mount with a clearance such that the threaded fastener can move through a limited range of movement relative to the leg mount, and at least a first leg comprising a protruding portion having a threaded aperture fixed to the protruding portion and configured to engage the first threaded fastener.

In some embodiments, the socket portion extends at an inclined angle relative to a surface of the structural furniture member, and wherein the end wall is spaced from the surface of the structural furniture member, providing clearance between the first threaded fastener and the surface of the structural furniture member to allow the first threaded fastener to move during an alignment of the threaded portion with the fastener aperture.

In some embodiments, the structural furniture member comprises at least a first recess and wherein the first threaded fastener comprises head extending into the first recesses to provide clearance for the head to move during an alignment of the threaded portion with the fastener aperture.

In some embodiments, the structural furniture member comprises at least a first recess, and wherein the first leg mount comprises a projection extending from beyond the mounting surface and into the first recesses.

In some embodiments, a clip can retain the first threaded fastener in the fastener aperture.

In some embodiments, the protruding portion comprises a leg outer surface sized to provide a snug fit with an inner side surface of the socket portion.

In some embodiments, a tapered aperture portion can define a tapered entrance to the fastener aperture.

In some embodiments, the clearance can comprise radial and axial clearances sized to allow the bolt to move over limited range of radial and/or axial movement relative to the fastener aperture during installation to improve alignability of the threaded portion and the first threaded aperture.

In some embodiments, the fastener aperture comprises at least one inwardly facing flat surface configured for anti-rotation registration.

In some embodiments, the first threaded fastener comprises at least a first outwardly facing flat surface configured to contact the at least one inwardly facing flat surface and thereby engage the fastener aperture with anti-rotation registration.

In some embodiments, at least a first retainer engaged with the first threaded fastener, the retainer being engaged with the threaded portion thereby retaining the threaded fastener in the fastener aperture.

In some embodiments, the first threaded fastener comprises a head, a shaft portion extending from the head, and a threaded portion extending from the shaft portion, the shaft portion configured to contact the fastener aperture and rotatably restrict rotation of the shaft relative to the aperture, wherein the shaft portion is smaller than the fastener aperture so as to define a clearance between the shaft portion and the fastener aperture.

In additional embodiments, a releasable attachment mechanism can include at least a first mount comprising a socket portion having an inner portion and an end wall disposed in the inner portion, at least a first fastener portion coupled with end wall, and at least a second fastener portion coupled to a protruding component configured to be inserted into the socket portion, the second fastener portion being configured to engage the first fastener portion, wherein at least one of the first and second fastener portions are coupled so as to allow a limited range of movement during alignment of the first and second fastener portions.

DETAILED DESCRIPTION OF EMBODIMENTS

Figure 1:
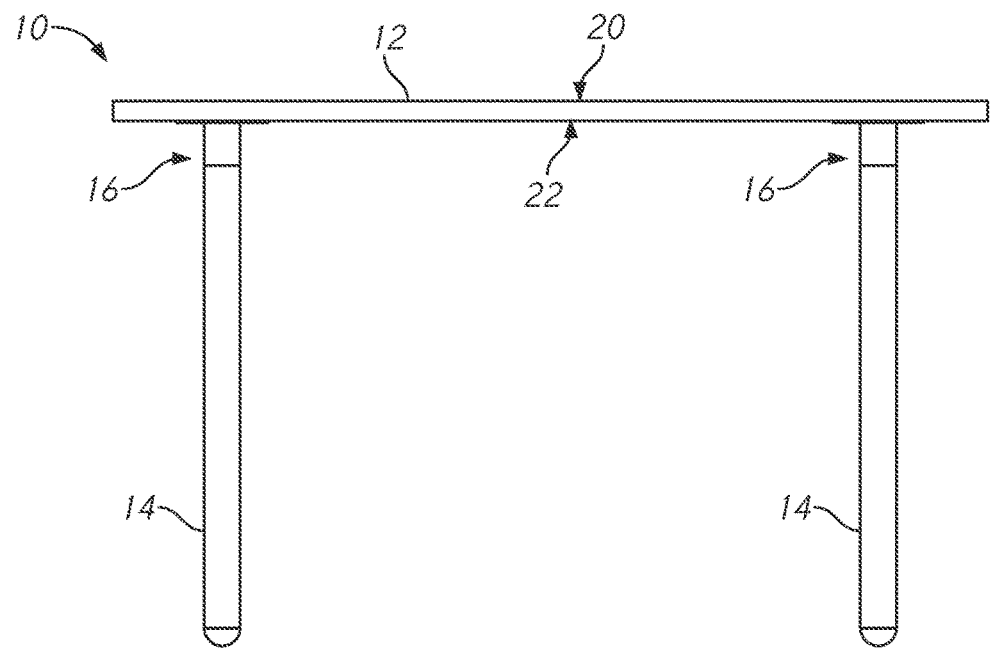
FIG. 1 is a side elevational view of a table having a removable leg arrangement in accordance with an embodiment.

The embodiments disclosed herein are described in the context of providing detachable attachment mechanisms for legs of pieces of furniture such as tables and desks because they have particular utility in that context. The inventions disclosed herein, however, can be used in other contexts as well, for example, but without limitation, for connecting legs to other types of furniture or devices, or for attaching other different pieces of furniture to one another, or for connecting other types of devices in other contexts.

Certain terms may be used in the following description for the purpose of reference only, and thus are not intended to be limiting. For example, terms such as "upper", "lower", "above", and "below" refer to directions in the drawings to which reference is made. Terms such as "front", "back", "rear", and "side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

FIG. 1 illustrates a furniture assembly 10 having a structural furniture member 12 and removable legs 14, according to an embodiment. In the illustrated embodiment, the furniture assembly is in the form of a table assembly 10 and the structural furniture member is a tabletop 12. The tabletop 12 can be considered as a tabletop or a desktop. The legs 14 can be connected to the tabletop 12 with attachment mechanisms 16. Each of the legs 14 and the attachment mechanisms 16 can be the same, and thus only one is described in the following description. In some embodiments, different legs and different attachment mechanisms can be also be used on the same table assembly 10. In some embodiments, the legs 14 can include height adjustment mechanisms 18.

The tabletop 12 can be formed of any type of material for any type of use. For example, the tabletop 12 can be in the form of solid wood, joined planks of wood, engineered materials such as MDF, recycled plastics, or other engineered materials. The tabletop 12 can be configured for use as a desk, a table, or another type of furniture. The tabletop 12 can include an upper surface 20 and a lower surface 22. The upper surface can be considered as serving as a working surface for a user when using the table 10.

Figure 2:
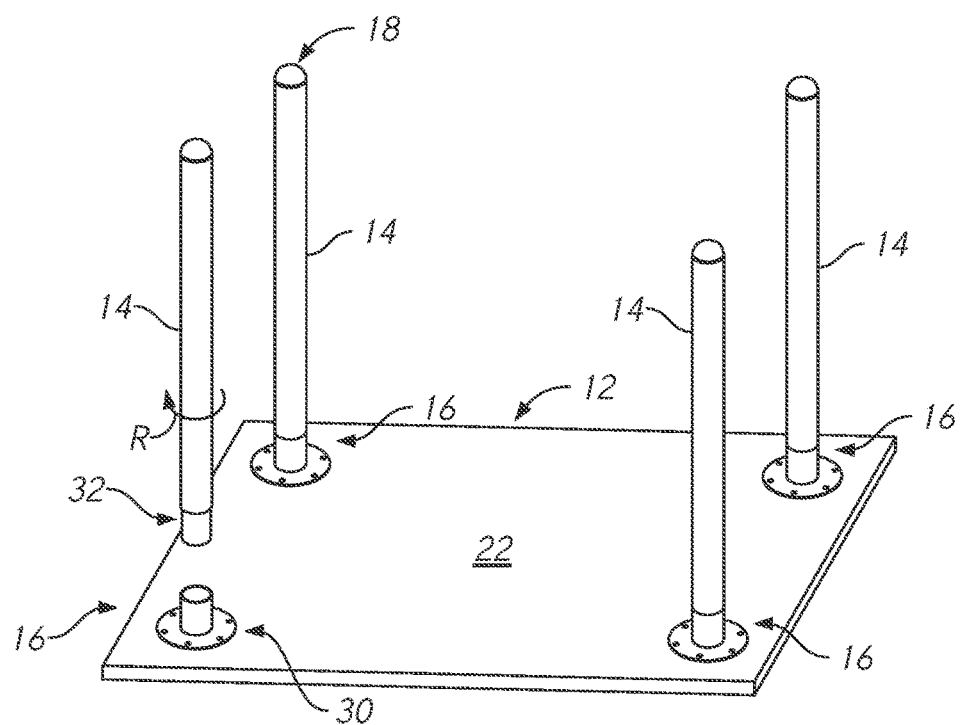
FIG. 2 is a bottom, front, and right side perspective view of the table of FIG. 1, with one leg illustrated in an exploded position.

As shown in FIG. 2, each of the legs are detachably removed by way of the removable attachment mechanism 16. During an assembly procedure, the leg 14 would be positioned for proper alignment of the attachment mechanism 16, then rotated in a direction of arrow R for threadedly engaging the leg 14, to the tabletop 12, through the attachment mechanism 16.

Figures 5, 6A:
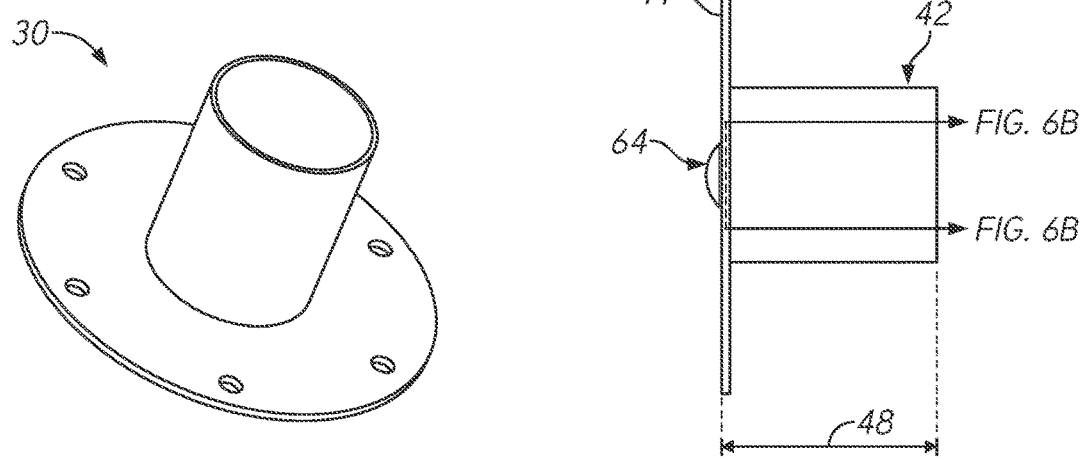
FIG. 5 is a perspective view of the socket of FIG. 3.
FIG. 6A is a side elevational view of the socket of FIG. 5.

In some embodiments, the attachment mechanism 16 includes a socket 30 and an engagement protrusion 32. In some embodiments, the socket 30 can be mounted to the tabletop 12, for example, on the bottom surface 22 of the tabletop 12. The engagement protrusion 32, in some embodiments, can be provided on an upper end of the leg 14. In some embodiments, the engagement protrusion is an upper end of the leg 14. In some embodiments, each of the socket 30 and the engagement protrusion 32 can include portions of a threaded fastener for providing a secure engagement between the engagement protrusion 32 and the socket 30. The socket 30 can have a height 48 (FIG. 6).

With continued reference to FIGS. 3-6, the socket 30 can include the mounting flange 40, a socket portion 42, and a first portion of a threaded fastener 44. The mounting flange portion 40 can have any shape. In the illustrated embodiment, the mounting flange 40 is in the form of a circular plate having a plurality of mounting holes 46. Any number of mounting holes can be used. The mounting holes are configured for receiving fasteners, for attaching the socket 30 to the tabletop 12. In some embodiments, self-tapping wood screws can be used with the mounting holes 46. Other types of fasteners can also be used.

The socket portion 42 can be mounted to the flange 40 in a central location of the flange 40. In some embodiments, the socket portion 42 is at the center of the flange portion 40.

In some embodiments, the socket portion 42 is formed of a cylindrical wall member 50. The cylindrical wall member can be attached to the flange with any known technique, such as bonding or welding, or it can be cast integrally with the flange 40.

The cylindrical wall 50 can include an outer surface 52 and an inner surface 54. The inner surface 54 can define an inner diameter 56. Additionally, the socket portion 42 can include an end wall 58. In some embodiments, the end wall 58 is formed integrally with the flange 40. In other embodiments, the end wall 58 is formed integrally with the cylindrical wall 50. For example, the end wall 58 can be permanently fixed relative to the cylindrical wall 50 by welding, bonding, or casting.

The end wall 58 includes fastener aperture 60. The fastener aperture 60 is sized so as to provide a desired amount of clearance with a fastener. Additionally, the fastener aperture 60 is configured to provide anti-rotational registration with a fastener. As such, a fastener can be inserted into the fastener aperture 60, with some allowable relative movement, but resistance against rotation.

The fastener 44 can be in the form of a bolt or a nut. In the illustrated embodiment, the fastener portion 44 is in the form of a bolt extending through a fastener aperture 60. The bolt 44 can include one or more engagement surfaces for engaging with the fastener aperture for anti-rotation registration. For example, in some embodiments, both of the fastener aperture 60 and the bolt 44 include one or more flat, mating surfaces that make contact during installation, preventing the bolt 44 from rotating relative to the aperture 60, thus providing anti-rotation registration.

Figure 6B:
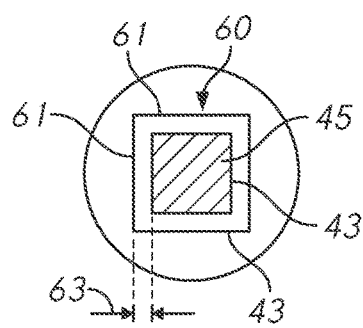
FIG. 6B is a partial section view of the socket of FIG. 6A, taken along line 6B-6B.

For example, with reference to FIG. 6B, in some embodiments, the aperture 60 includes one or more flat, inwardly facing surfaces 61. In some embodiments, the aperture is rectangular or square and thus has four flat, inwardly facing surfaces 61.

The bolt 44 can include surfaces for cooperating with the one or more inwardly facing surfaces 61 to provide anti-rotation registration with the aperture 60. For example, the bolt 44 can include a shaft portion 45 with one or more outwardly facing flat surfaces 43 configured to abut against the one or more inwardly facing flat surfaces 61. For example, the flat surfaces 43 of the shaft portion 45 can be arranged to define a rectangular or square cross-section. The outer dimensions of the flat sides 43 of the bolt 44 can be slightly smaller than the inner dimensions of the flat surfaces 61 of the aperture 60. Such sizing can provide a clearance 63 such that the bolt 44 cannot rotate when it is received within the aperture 60, but it can be moved, for example, in a translational and/or pivoting direction and the direction of the arrow $P_L$ (FIGS. 3 and 4) which represents "play" between the bolt 44 and the aperture 60. The clearance 63 can be considered as defining a radial clearance between the bolt 44 and the aperture.

Optionally, a retaining clip 62 can be engaged with the bolt 44 for capturing and maintaining the bolt 44 in place within the aperture 60. For example, the clip 62 and the head 64 of the bolt 44 can both be larger than the aperture 60 and thus capture the bolt 44 in the orientation illustrated in FIG. 4, but with sufficient clearance to allow for "play," as described above, in directions of the arrows $P_L$, as well as some play in the axial direction, perpendicular to the arrows $P_L$. The clearance between the head 64, clip 62 and the surfaces of the end wall can be considered as an axial clearance. In some embodiments, the amount of deflection either axially and or in the direction of arrows $P_L$ can be relatively small, for example, in the range of the fraction of a millimeter, one millimeter, two millimeters, or more. As such, movement of the bolt 44 is limited. Embodiments including the radial and/or axial clearances thus allow for a limited range of radial and/or axial movement of the bolt 44 relative to the aperture 60.

In the illustrated embodiment, the movement of the bolt 44 is generally free from resistance. In other embodiments, other attachment arrangements can be used to provide some resistance to the movement of the bolt 44, for example, axially and/or in the directions of arrows $P_L$. For example, an additional soft, elastic, and/or resilient material (not shown) can be disposed between the bolt 44 and the socket 30, between the bolt 44 and the aperture 60 and/or in contact with the head 64, to provide some resistance to movement without fixing the bolt 44 to the socket 30. Other configurations can also be used.

Figures 3, 4:
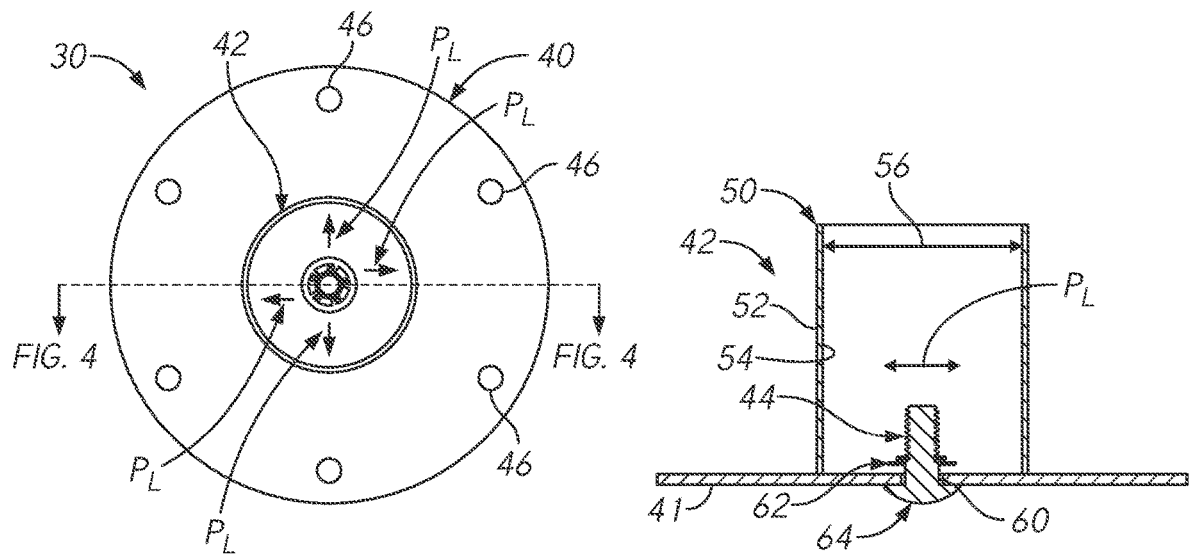
FIG. 3 is a top plan view of a socket that can be used in the table of FIG. 1.
FIG. 4 is a cross-sectional view of the socket of FIG. 3, taken along line 4.-4.

In some embodiments, the head 64 of the bolt 44 is rounded, for example, in the form of a "carriage bolt". Other shapes of bolt heads can also be used. As shown in FIGS. 4 and 6, the head 64 protrudes beyond the plane of the lower surface 41 of the flange 40.

Another aspect of at least one of the inventions disclosed herein includes the realization that in a configuration in which the head of a fastener extends beyond a lower mounting surface of a flange, such as that illustrated in FIGS. 4 and 6, a further advantage can be achieved by providing a recess in a mounting surface that provides clearance for movement of the fastener, during use. As such, when installed to a piece of furniture, such as the tabletop 12, the bolt 44 can still be moved along the directions $P_L$ for providing improved alignability, during use.

Figure 7:
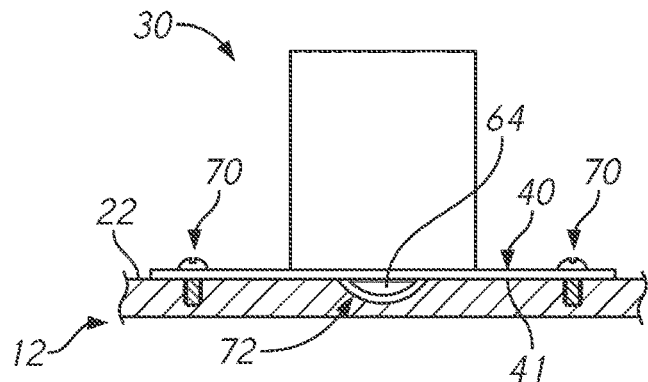
FIG. 7 is a side elevational, partial sectional, and exploded view of the socket of FIG. 3 connected to the tabletop in FIG. 1 and upper portion of a leg of FIG. 2.

For example, as shown in FIG. 7, the socket 30 is mounted to the bottom surface 22 of the tabletop 12 with a plurality of threaded fasteners 70 extending through the apertures 46 of the flange 40. In this orientation, the head 64 protrudes downwardly from the bottom surface 41 of the socket 30. Thus, in the illustrated embodiment, the bottom surface 22 of the tabletop 12 includes a preformed fastener recess 72.

The preformed fastener recess 72 can be sized to be slightly larger than the head 64 of the bolt 44. For example, the inner surface of the recess 72 can have a larger dimension than the outer dimensions of the head 64. In the illustrated embodiment, the head 64 is generally rounded, or partially spherical, in the form of what is commonly known as a "carriage bolt." Thus, in the illustrated embodiment, the recess 72 is in the form of a hemispherical or partially spherical concave indention in the lower surface 22 of the tabletop 12.

In some embodiments, a radius of curvature and maximum depth of the recess 72 can be larger than the radius of curvature of the head 64 and the maximum height of the head as measured from the bottom surface 41 of the flange 40. In embodiments where other shapes of the head 64 is used, the recess 72 may or may not be differently shaped so as to provide the desired amount of play of the head 64 when the socket 30 is installed in the manner illustrated in FIG. 7.

With continued reference to FIG. 7, the engagement protrusion 32 of the leg 14 can include an outer surface 78 defining an outer diameter 80, as well as a second portion 82 of a threaded fastener. The second portion 32 can be in the form of a nut, a threaded aperture, and/or a straight aperture configured for a self-tapping screw. In the illustrated embodiment, the engagement protrusion 32 includes a lower plate member 84 with an aperture 86. The aperture 86 can include threads, configured to engage the threads of the bolt 44. Optionally, the aperture 86 can include a tapered portion 88, having a wider end facing outwardly, so as to be oriented toward the bolt 44 in use. In other embodiments, a nut (not shown) can be secured over the aperture 86, for example, but without limitation, by welding, bonding, or other attachment techniques. In other embodiments, the bolt 44 can be mounted to the protrusion 32 and a nut can be secured to the end wall 58 of the socket.

The leg 14 and/or the engagement protrusion 32 can be formed from various different kinds of materials. In the illustrated embodiment, the engagement protrusion 32 is made from cylindrical metal, such as steel, aluminum or other metals. The plate 84 is attached to the end of the cylindrical portion. In other embodiments, the leg 14 and/or the engagement protrusion 32 can be made from other solid materials, for example, wood, plastic, or other materials. In such solid embodiments, the end plate 84 can be mounted to the end of the solid material. In other embodiments, threads can be formed directly in the solid material forming the engagement protrusion 32, or a nut can be embedded in the end of the solid material forming the engagement protrusion 32. Other configurations can also be used.

Figure 8A:
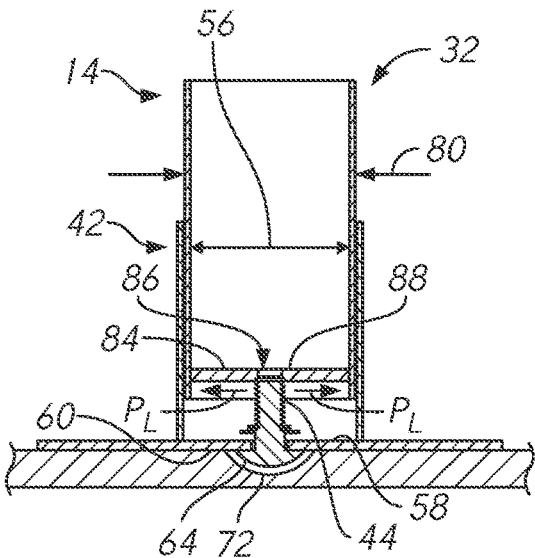
FIG. 8A is an exploded and sectional view illustrating an alignment of an upper portion of a table leg being aligned within the socket of FIG. 7.
Figure 8B:
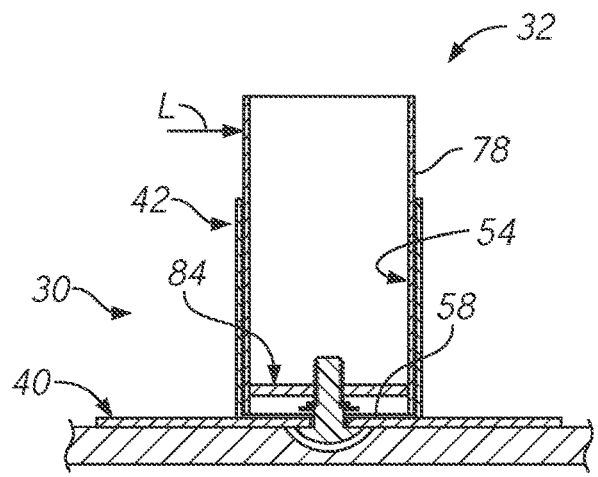
FIG. 8B is a further cross-sectional view of the upper end of the table leg fully inserted into the socket of FIG. 8A and tightened to a fully installed orientation.

With reference to FIG. 8, the outer diameter 80, in some embodiments, can be close to the inner diameter 56 of the socket portion 42. For example, the inner diameter 56 and the outer diameter 80 can be sufficiently close to generate a "snug" or "tight" fit. Depending on the materials used for these components, different tolerances can be appropriate. In some embodiments, sufficient clearance can be left to allow for insertion of the leg 14 into the socket portion 42 as well as rotation of the leg 14 relative to the bolt 44, without the use of tools. Providing a "snug" or "tight" fit generates more contact between the outer surface of the leg 14 and the inner surface 54 of the cylindrical wall 50, and thereby loads imparted onto the leg 14 can be better imparted onto the socket portion 30.

With reference to FIG. 8, during an installation procedure, the engagement protrusion 32 is aligned with the cylindrical wall 50 and inserted therein. The outer diameter 80, being approximately the same as or slightly less than the inner diameter 56 allows the engagement protrusion to move into the interior of the socket portion 42.

As illustrated in FIG. 8, as the engagement protrusion 32 is pushed downwardly into the socket portion 42, the aperture 86 initiates contact with an upper end of the bolt 44. By way of the clearance between outer surfaces of the bolt 44 and inner surfaces of the aperture 60, the bolt 44 can pivot and deflect, for example, in the directions of arrow $P_L$ and also may translate to achieve alignment with the aperture 86. Additionally, the tapered portion 88 can provide the optional additional advantage of helping to guide the end of the bolt 44 into proper alignment with the threads of the aperture 86.

With reference to FIG. 9, as the aperture 86 is brought into contact with the upper end of the bolt 44, a user can rotate the leg 14 and thus rotate the engagement protrusion 32 to thereby rotate the aperture 86. Due to the anti-rotation registration of the bolt 44 with the aperture 60, the bolt 44 does not rotate and thus the aperture 86 and the threads on the bolt 44 can engage. Further twisting of the leg 14 thus can draw the engagement protrusion 32 deeper into the socket portion 42 until a lower end portion of the engagement protrusion 32 reaches a bottom wall surface 58 of the socket portion 42.

Optionally, in some embodiments, the diameter 80 can be significantly greater than the diameter of the bolt 44. Thus, a user can easily create sufficient torque on the leg 14 with their hands for twisting the leg 14 with sufficient force to secure the leg 14 to the bolt 44 and the socket portion 42. Additionally, because the bolt 44 is not permanently fixed to the end wall 58 of the flange 40, the bolt 44 is loaded entirely or primarily in tension during use.

For example, in use, lateral loads L acting against the leg 14, as illustrated in FIG. 9, can create bending loads onto the socket 30 due to the interaction between the outer surface 78 of the engagement protrusion 32 against the inner surface 54 of the socket portion 42. The lateral load L can impart a torque onto the socket 30. Such a lateral load L could cause elastic deformation of the socket portion of 42 relative to the flange 40. If the bolt 44 were permanently fixed to the aperture 60 in a fixed orientation (for example by bonding or welding), some of that torque created by the lateral load L would also be imparted to the connection between the bolt 44 and the aperture 60. However, due to the floating, non-fixed, engagement between the end wall 58 and the bolt 44, the bolt 44 can move relative to the aperture 60 and thus such elastic deformation of the socket portion 42 would result in less loads being imparted onto the bolt 44, leaving the bolt 44 loaded primarily in tension.

With reference to FIG. 8, during an installation procedure, the recess 72 being slightly larger than the head 64 of the bolt 44, allows for additional freedom of movement of the bolt 44, for example, during initial contact of the bolt 44 with the aperture 86.

Figure 9A:
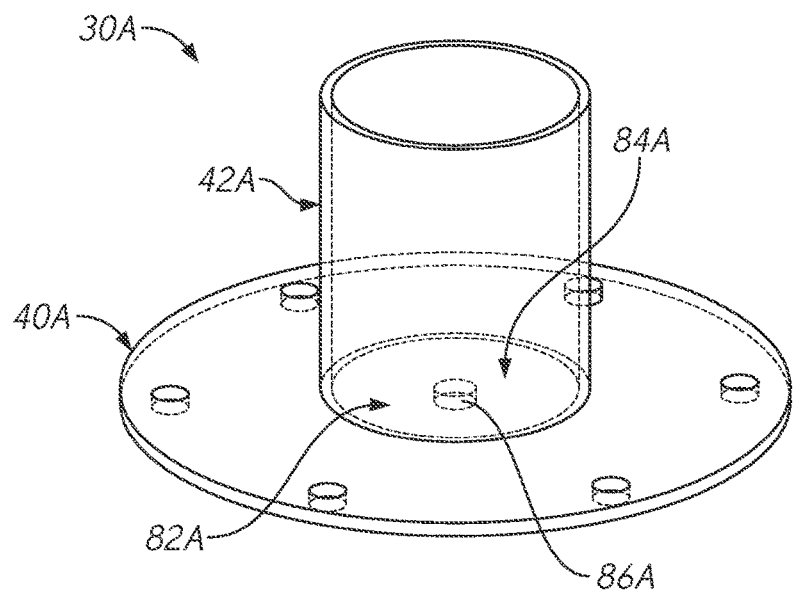
FIG. 9A is a perspective and transparent view of a variation of the socket of FIG. 3.
Figure 9B:
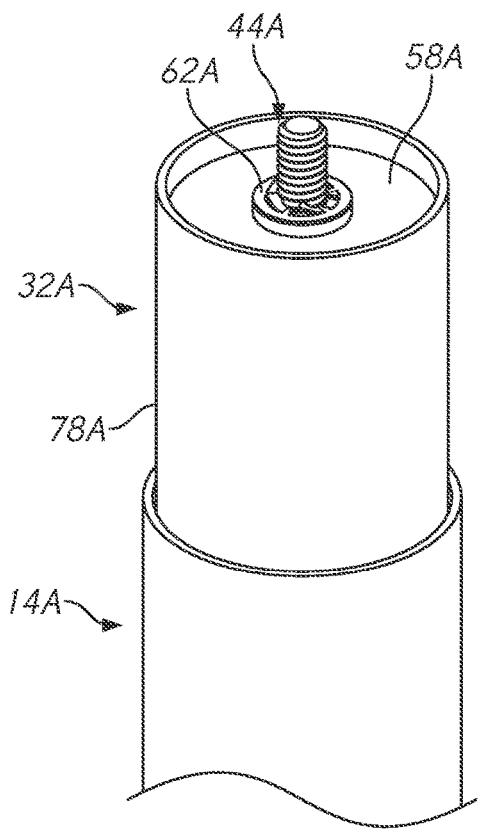
FIG. 9B is a perspective view of a variation of the upper portion of a leg of FIG. 7.
Figure 9C:
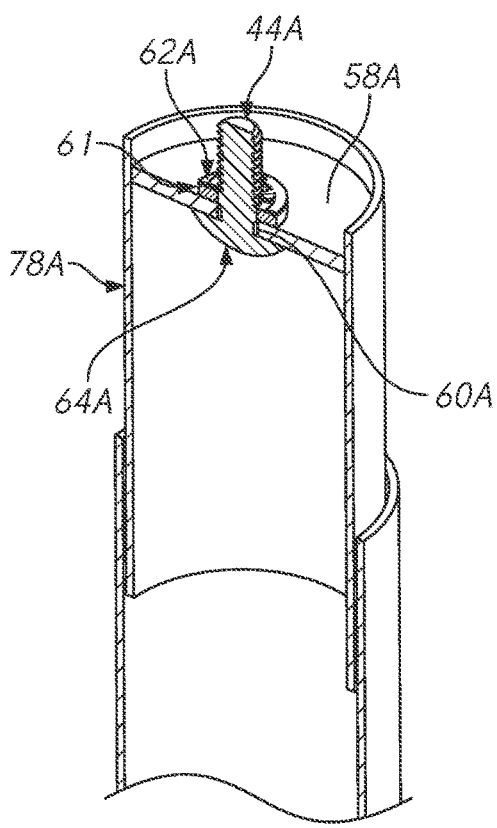
FIG. 9C is a perspective and sectional view of the upper portion of the leg of FIG. 9B.
Figure 9D:
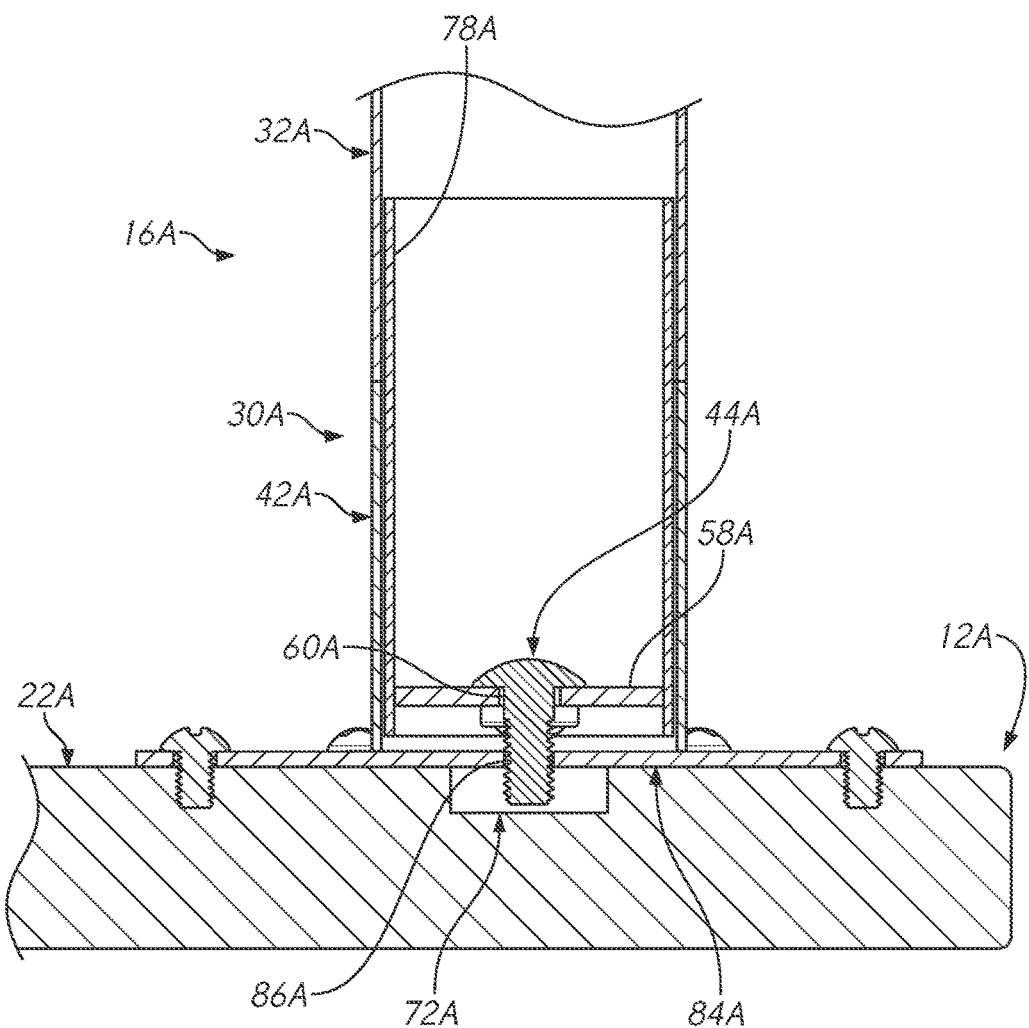
FIG. 9D is a sectional view of the upper portion of the leg of FIG. 9B connected to the socket of FIG. 9A.

FIGS. 9A-9D illustrate a variation of the embodiment of the attachment mechanism 16 identified generally by the reference numeral 16A (FIG. 9D). Parts, components, and features of the connection mechanism 16A are identified with the same reference numerals as the connection mechanism 16 (FIGS. 1-10), except that a letter "A" has been added thereto.

The attachment mechanism 16A is similar to the attachment mechanism 16, except that the position of the first and second portions of the threaded fastener are reversed; the first portion of a threaded fastener 44A being on the leg and the second portion 82A being on the socket portion 30A.

More specifically, the socket 30A includes a flange 40A and a socket portion 42A. The socket portion 42A includes a bottom wall 84A which includes a second portion of a fastener 82A. Like the second portion 82 of the embodiment of FIG. 1-FIG. 8, the second portion of a threaded fastener 82A is in the form of an aperture 86A with internal threads. Alternatively, the second portion of a threaded fastener 82A can be in the form of a nut (not shown) mounted over the aperture 86A and configured to threadedly engage the bolt 44A (FIGS. 9B-9D).

With reference to FIGS. 9B and 9C, the engagement protrusion 32A includes the first portion of a threaded fastener 44A, which is in the form of a bolt in the present embodiment, connected to the upper end of the leg 14A in a manner that provides some "play" as well as anti-rotation and registration. For example, the engagement protrusion 32A can include an end wall 58A including an aperture 60A. The bolt 44A can extend through the aperture 60A. Like the embodiment of FIGS. 1-8, the aperture 60A can include inwardly facing surfaces configured to cooperate with outwardly facing surfaces of the bolt 44A to provide clearance and thus some "play" as well as anti-rotation registration. A clip 62A can be used to retain the bolt 44A within the aperture 60A. For example, the clip 62A and the head 64A of the bolt 44A can be larger than the aperture 60A and thereby capture the bolt 44A within the aperture 60A.

Optionally, a resilient member 61 can be disposed between the end wall 58A and the clip 62A to provide some cushioning or resistance against movement during use.

With reference to FIG. 9D, the bottom surface 22A of the tabletop 12A can include a recess 72A configured to provide clearance for a distal end of the bolt 44A. For example, as shown in FIG. 9D, the engagement protrusion 32A is fully seated in the socket 30A with a portion of the bolt 44A extending into the recess 72A.

Figure 10:
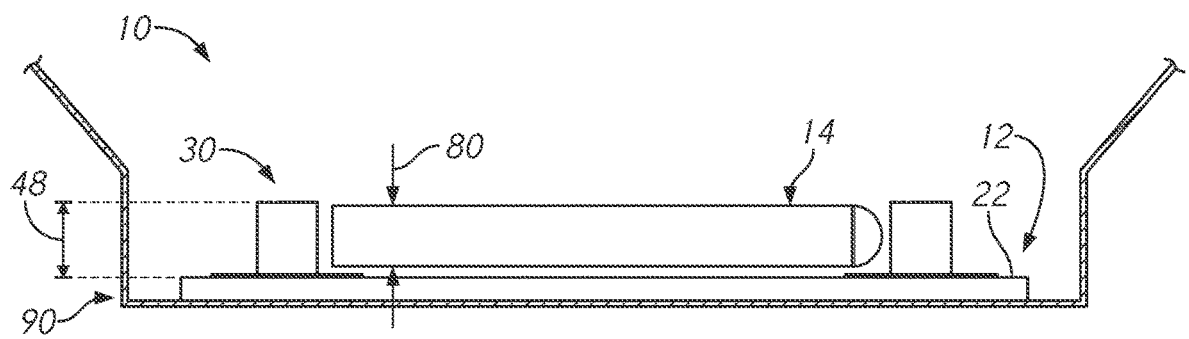
FIG. 10 is a schematic illustration of the table of FIG. 1, with all legs removed and inserted into a box.
Figure 11:
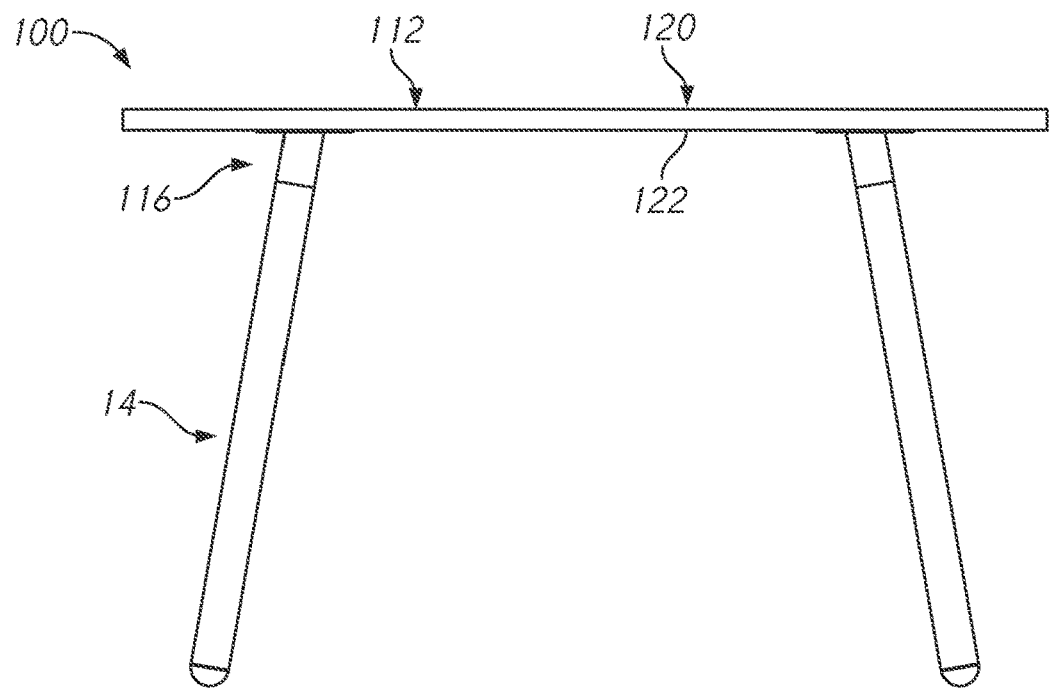
FIG. 11 is a further embodiment of the table of FIG. 1, including a removable leg attachment arrangement with non-perpendicular legs.

With reference to FIG. 10, any of the above described embodiments of FIGS. 1-9D, although only the embodiments of FIGS. 1-8B are specifically referenced below, can provide for a conveniently assemblable and disassemblable table or desk kit. For example, as noted above, the legs 14 can be attached to the tabletop 12 without any tools. Additionally, in some embodiments, the dimensions of certain components of the table assembly 10 can be configured for efficient packing for shipping.

For example, as noted above, the mounts 30 can have a height 48. In some embodiments, the height 48 is approximately equal to, larger than, or slightly smaller than the diameter 80 of the leg 14. As such, the desk assembly 10 can be considered as a desk kit, in a disassembled state, such as that illustrated in FIG. 10.

In FIG. 10, the legs 14 are removed from the mounts 30 and arranged adjacent to the lower surface 22 of the tabletop 12. Because the outer dimensions of the leg 14, in the illustrated embodiment, the diameter 80 is approximately the same, slightly greater than, or less than the height 48, the legs 14 can be efficiently placed within a box 90 for packaging and/or shipping the desk 10, thereby forming a desk kit. The efficient nesting of the legs 14 within the approximate height 48 of the mount 30 allows for the components of the desk 10 to efficiently fill the box 90, with less empty space. Additionally, forming the mount 30 with the height 48 provides additional strength to the mount 30, for example, for resisting lateral loads L (FIG. 8B) imparted onto the legs 14 during use. Thus, making the height 48 of the mount 30 approximately the same as, larger than, or slightly smaller than the diameter 80 of the leg 14 provides the dual advantages of strength and packaging efficiency.

As such, a consumer can receive the kit having the desk components 10 in an efficiently packed box 90, for example, by mail. Additionally, as described above, features of the embodiments described above allow the desk to be assembled without any tools.

Additionally, because of the packaging efficiency achieved by the configurations noted above, the mounts 30 can be pre-attached to the tabletop 12 prior to packaging. As such, there is little for the end user to do to assemble the table 10 for use.

FIGS. 11-19 illustrate a further embodiment of the table kit 10, identified generally by the reference numeral 100. Parts, components, and features are described and identified below using the same reference numerals as the embodiment of FIGS. 1-10, except that the value of "100" has been added thereto.

The table kit 100 includes a tabletop 112 having an upper surface 120 and a lower surface 122 supported by legs 14 that are mounted relative to the tabletop 112, at an angle by way of the releasable engagement devices 116.

Figure 12:
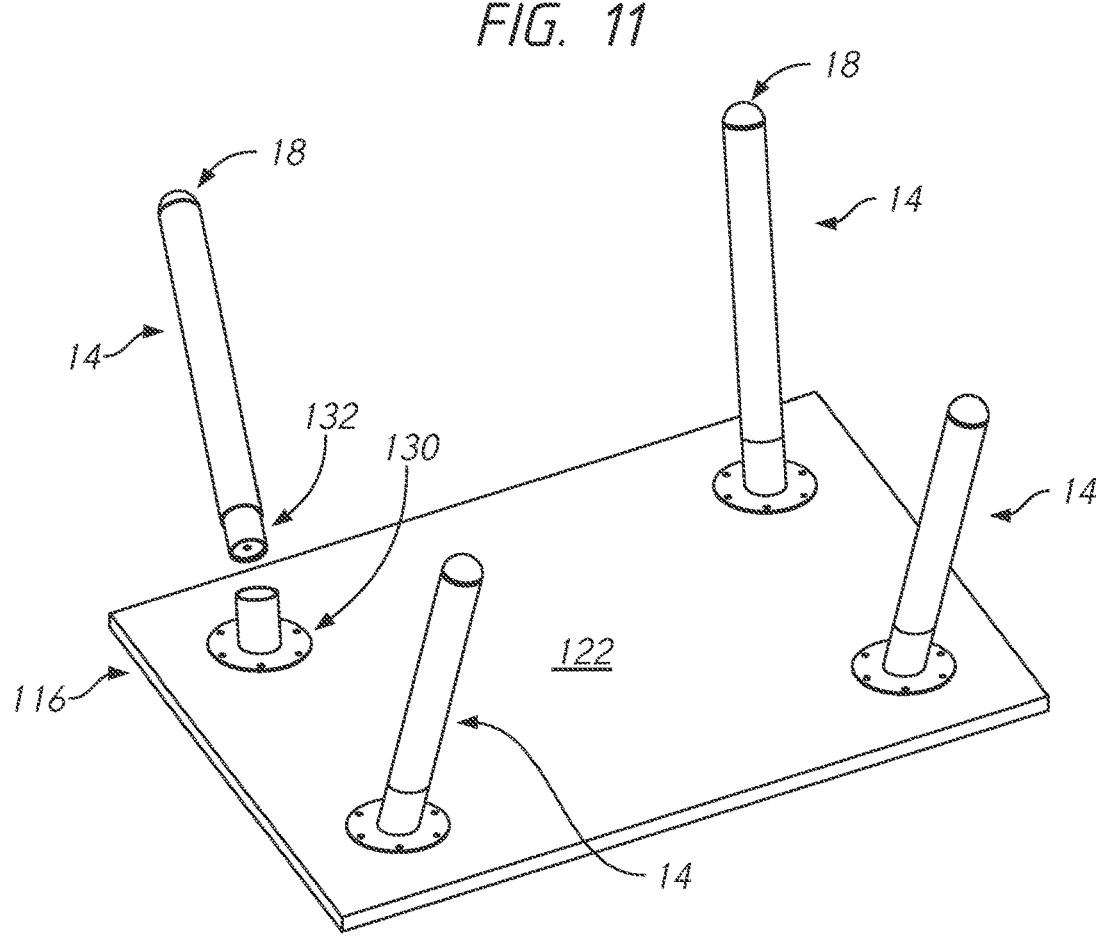
FIG. 12 is a bottom, front, and left side perspective view of the table of FIG. 11, with one leg illustrated in an exploded position.

As shown in FIG. 12, the legs 14 include the engagement protrusion 32 configured to engage the mounts 130.

With reference to FIGS. 13-16, the mount 130 includes a flange 140 having a plurality of apertures 146. The flange 140 can, optionally, include a visual indicator for identifying a location of an alignment tab 149. The function of the alignment tab 149 is described below. In some embodiments, the visual indicator for the position of the alignment tab 149 is an aperture 147 that has a different shape than the other apertures 146. For example, in some embodiments, the visual indicator 147 can be in the form of an oval aperture, being visibly distinct from the remaining apertures 146 and thereby providing a visual indication to a professional assembling the mounts 130 to the tabletop 112.

Figure 13:
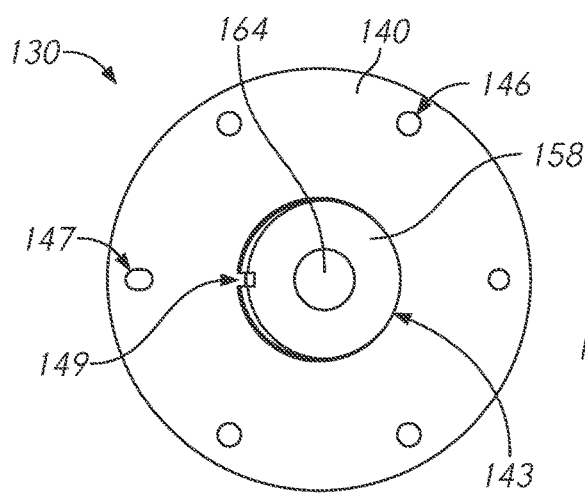
FIG. 13 is a bottom plan view of a socket that can be used with the table of FIG. 11.

With continued reference to FIG. 13, in some embodiments, the flange can also include a central aperture 141.

Figure 14:
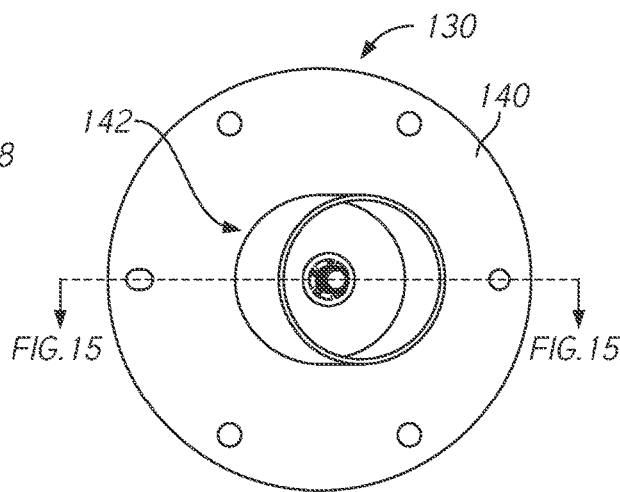
FIG. 14 is a top plan view of the socket of FIG. 13.
Figure 15:
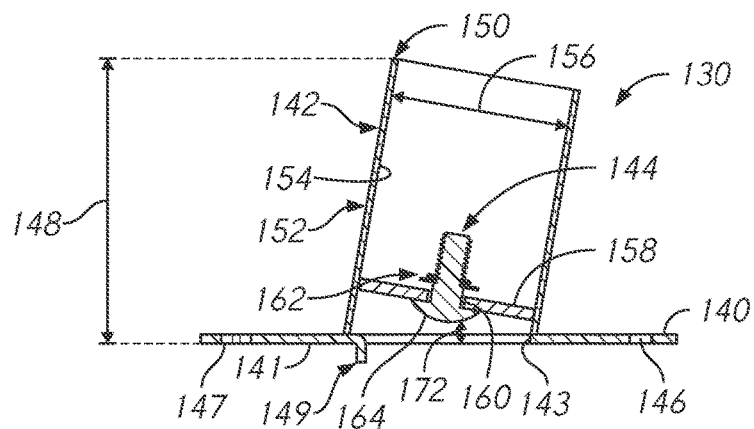
FIG. 15 is a cross-sectional view of the socket of FIG. 14, taken along line 15.-15.
Figure 16:
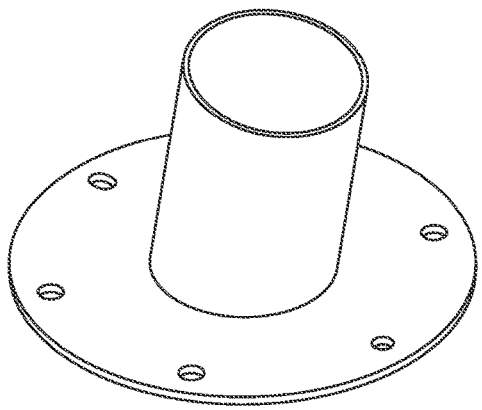
FIG. 16 is a perspective view of the socket of FIG. 13.

With continued reference to FIGS. 14-16, the mount 130 includes a socket portion 140 that is inclined relative to the flange 140. The orientation of the socket portion 140 relative to the flange 140 determines the angle at which the legs 14 would extend relative to the tabletop 112, after installation.

In some embodiments, the socket portion 142 is formed from a cylindrical wall member 150, for example, in the configuration of a pipe. The cylindrical wall 150 can include an inner surface 154, an outer surface 152, an inner diameter 156, and an end wall 158. The lower end of the cylindrical wall member 150 can be attached around the central aperture 141 of the flange 140.

The lower wall 158 can include the aperture 160, as in the previous embodiments, configured for anti-rotation registration with the bolt 144. In the illustrated embodiment, the end wall 158 is round and thus is mated with the inner surface 154 of the cylindrical wall member 150, and extending in a direction perpendicular to a central axis of the cylindrical wall member 150. Such a configuration also supports a good alignment of the bolt 144 for a procedure for attachment to the leg 14.

As with the previous embodiments, outer surfaces of the bolt 144 are configured for an anti-rotation registration with surfaces of the aperture 160. Additionally, the clip 162 cooperates with the head 164 to retain the bolt 144 a floating engagement with the end wall 158. The lower surface of the end wall 158 is spaced upwardly (as viewed in FIG. 15) from the lower surface 141 of the flange 140. The space 172 can be considered as being a distance between the lowermost surface of the head 164 relative to a plane of the bottom surface 141 of the flange 140. This provides the space 172 between the lower surface of the end wall 158 and the lower surface 122 of the table 112, in use, thereby allowing the head 164 room for movement during installation.

The alignment tab 149 extends downwardly from a lower surface 141 of the flange 140. This alignment tab 149 can be used to ensure proper orientation of the mount 130 during attachment to the tabletop 112.

Figure 17A:
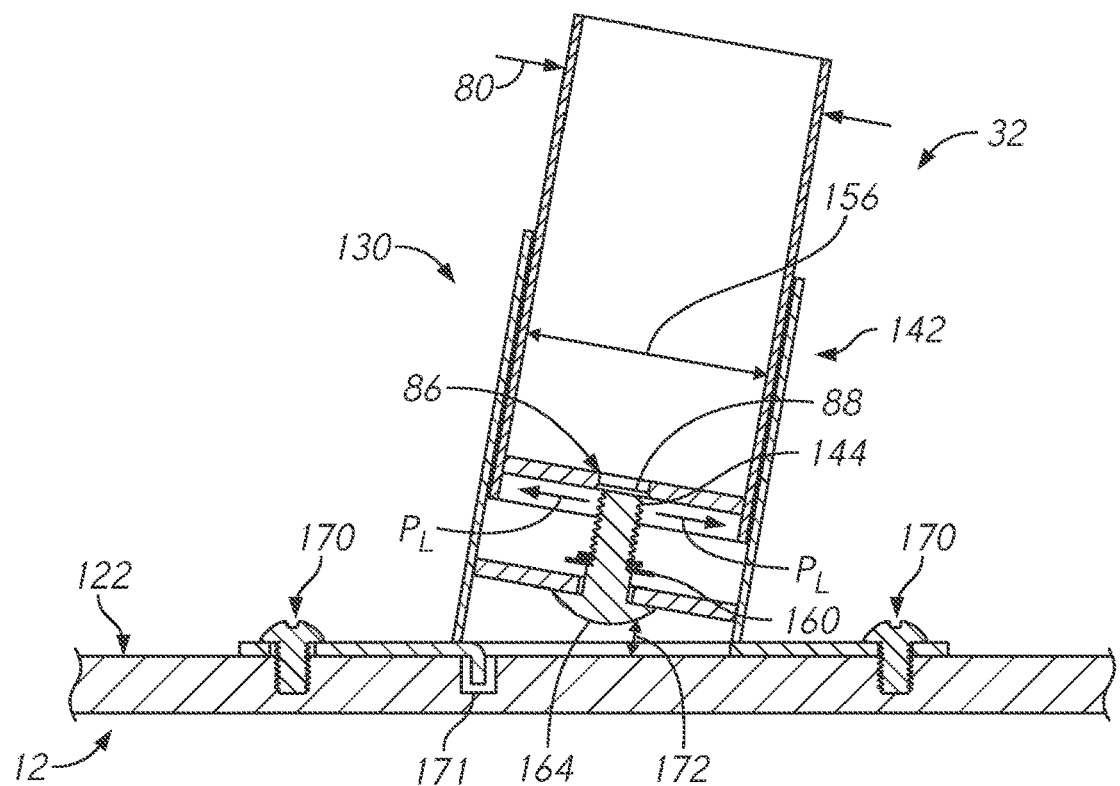
FIG. 17A is a cross-sectional view of the socket of FIG. 13 attached to a tabletop of FIG. 11, with an upper end portion of a leg partially inserted in the socket.
Figure 17B:
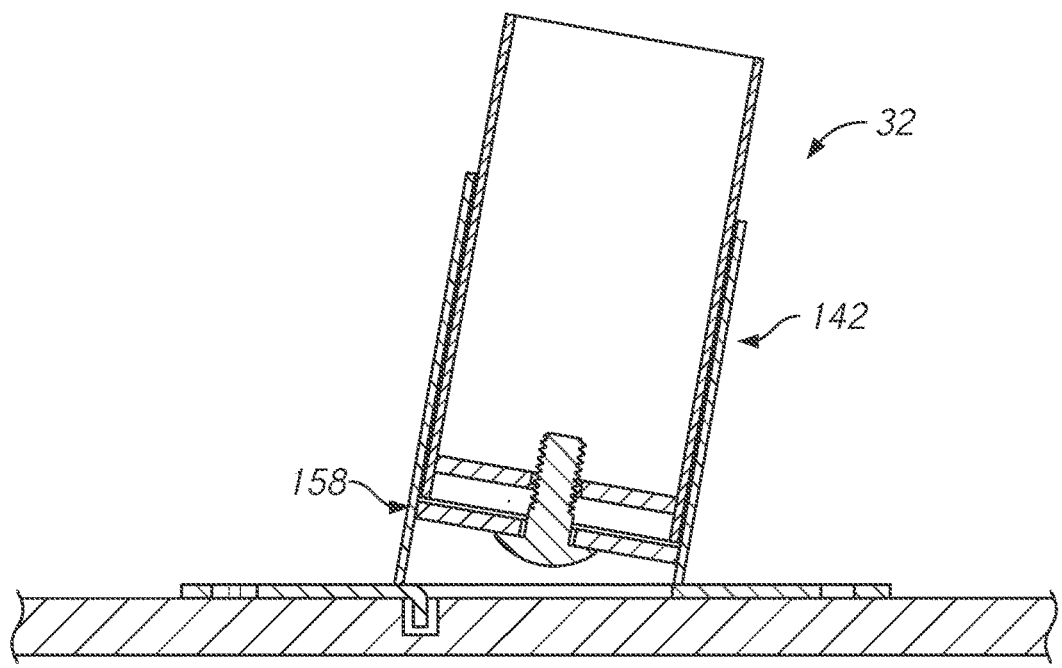
FIG. 17B is a further cross-sectional view of the embodiment of FIG. 17A, with the upper end of the leg fully seated into the socket.

For example, with reference to FIG. 17, the tabletop 112 can include a preformed recess 171 opening on the lower surface 122. Additionally, in some embodiments, holes for the fasteners 170 can also be predrilled prior to attachment of the mount 130 to the tabletop 12. As such, with the recess 171 and holes for the fasteners 170 being predrilled, the mount 130 can be easily aligned into the proper orientation such that the socket portion 142 tilts in the desired orientation for supporting the legs 14 at the desired angle.

With continued reference to FIG. 17, during an assembly procedure, the engagement protrusion 32 is inserted into the socket portion 142 wherein the clearance between the outer diameter 80 and the inner diameter 156 can provide for a snug or tight fit, but still allow for rotation of the engagement protrusion 32 relative to the socket portion 142.

As the aperture 86 and/or the taper 88 comes into contact with the upper end of the bolt 144, the floating engagement of the bolt 144 relative to the aperture 160 allows the bolt 144 to move, for example, axially and/or in the directions of the arrows $P_L$. This movement is additionally supported by the space 172, which allows the head 164 of the bolt 144 to remain spaced away from the lower surface 122 of the table 12. This enhances the engagability of the aperture 86 with the threads on the bolt 144. Twisting of the engagement protrusion 32 would draw the engagement protrusion 32 further into the socket portion 142 by way of the threaded engagement between the aperture 86 and the threads of the bolt 144, until the lower end of the engagement protrusion 32 reaches the upper surface of the end wall 158.

Thus, like in the above embodiments, the lack of a permanent, fixed attachment between the bolt 144 and the bottom plate 158 allows for easier collimation and engagement of the threads of the bolt with the aperture 86 and can also reduce or prevent additional loads from being imparted onto the bolt 144 during use, allowing the bolt 144 to remain more in tensile loading during use.

Figure 18A:
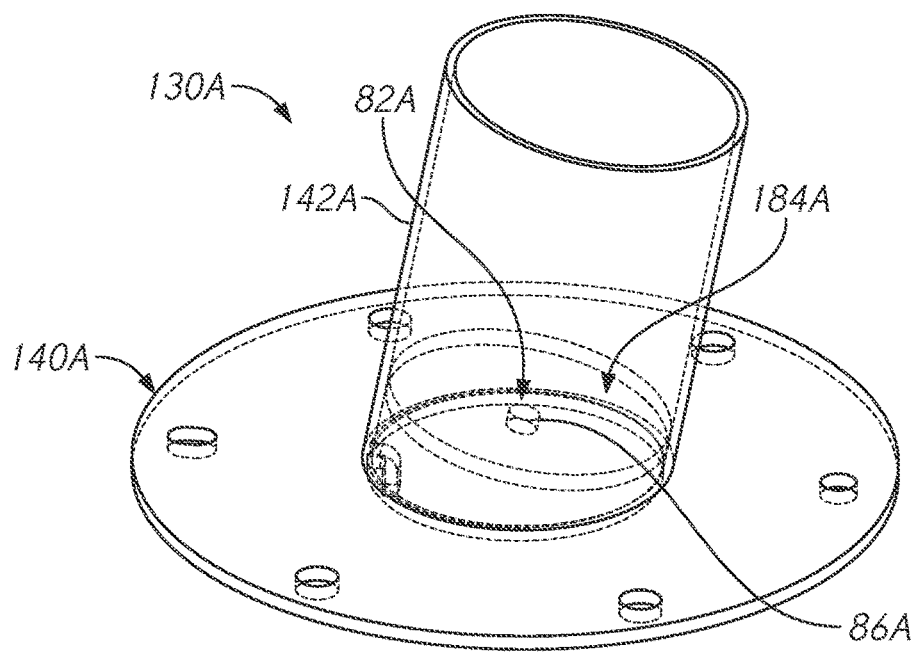
FIG. 18A is a perspective and transparent view of the socket of FIG. 13.
Figure 18B:
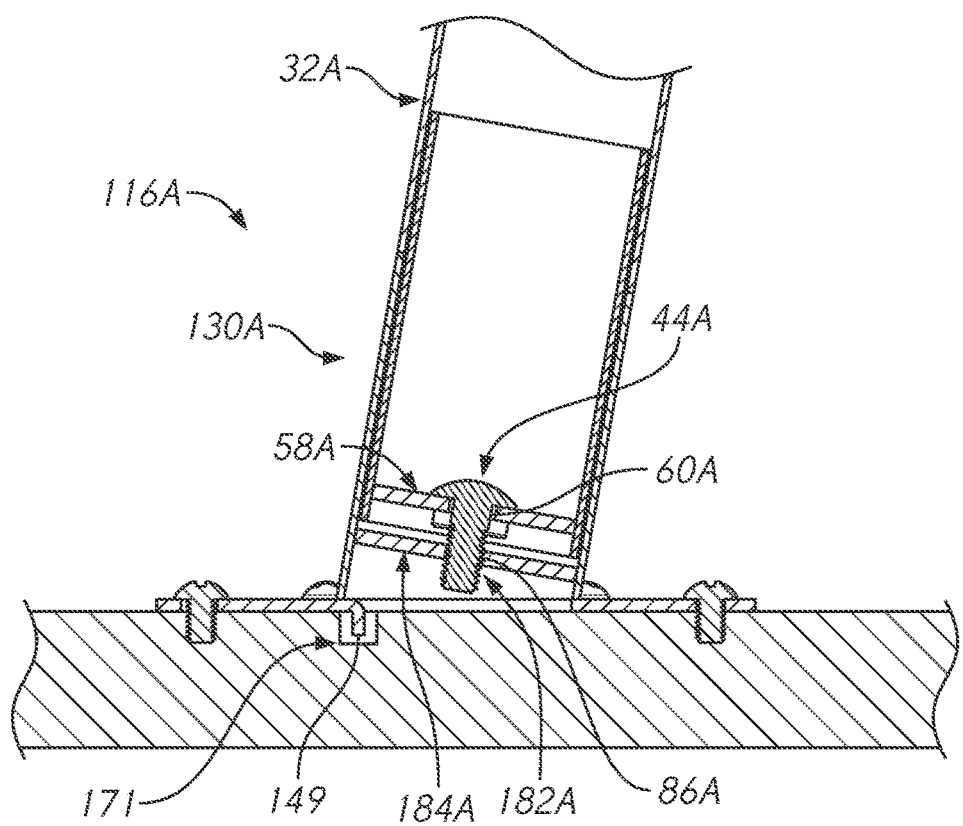
FIG. 18B is a sectional view of the socket of FIG. 18A engaged with the upper portion of the leg of FIG. 9B.

FIGS. 18A and 18B illustrate a variation of the attachment mechanism 116, identified generally by the reference numeral 116A. Parts, components, features, and advantages of the attachment mechanism 116A that are the same or similar to the attachment mechanism 116, are identified with the same reference numeral except that a letter "A" has been added thereto.

With reference to FIG. 18A, the socket 130A can include a flange portion 140A, a socket portion 142A and an end wall 184A. The end wall 184A can include an aperture 86A and a second portion of a threaded fastener 82A. In the illustrated embodiment, the second portion of the threaded fastener 82A is in the form of internal threads on the aperture 86A. However, in other embodiments, the second portion 82A can be in the form of a nut (not shown) mounted over the aperture 86A.

With reference to FIG. 18A, the protruding portion 32A can be inserted into the socket 130A with the bolt 44A engaging with the second portion 82A.

Figure 19:
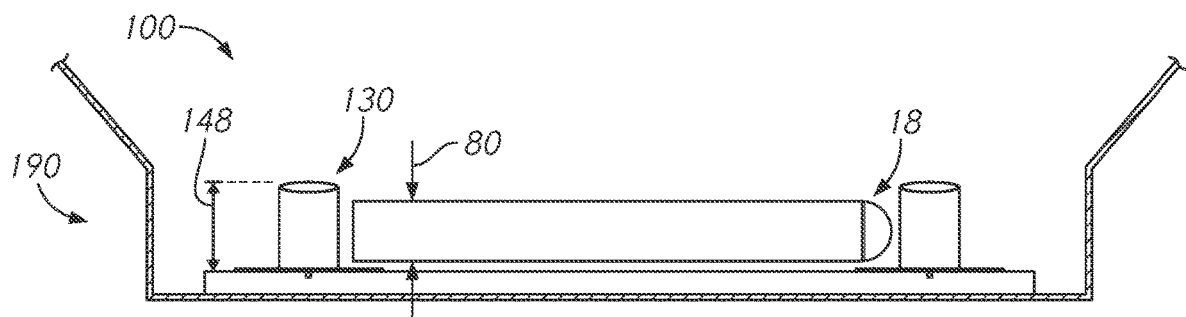
FIG. 19 is a schematic view of the table of FIG. 11 disassembled and inserted into a box.

With reference to FIG. 19, as in the above embodiments, the height 148 of the mounts 130 can be approximately the same as, slightly larger than, or slightly smaller than the diameter of the legs 80, thereby allowing for efficient packaging of the table kit 100 into a box 190.

Figure 20:
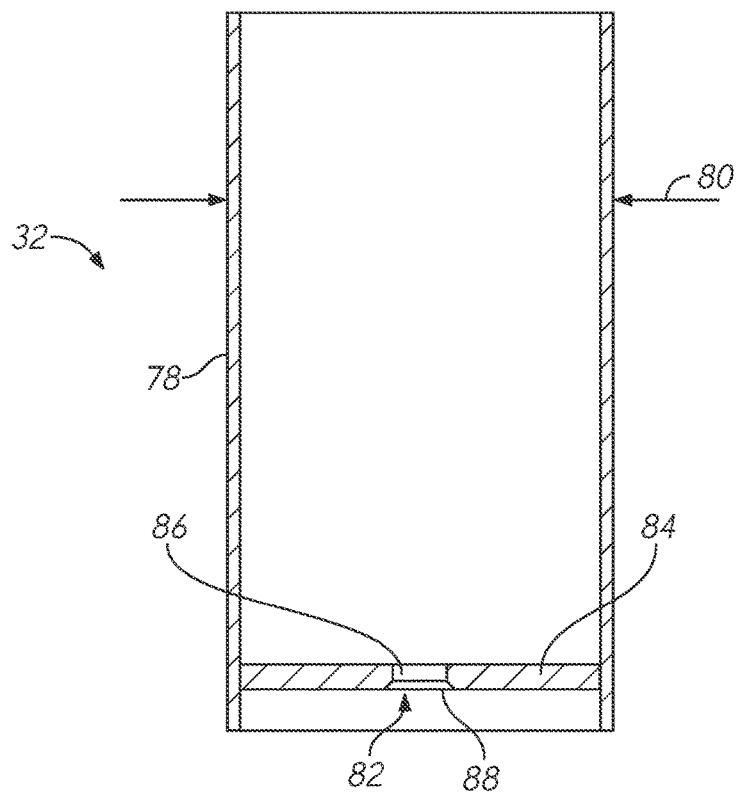
FIG. 20 is a cross-sectional view of an engagement protrusion.

FIG. 20 shows engagement protrusion 32. The engagement protrusion 32 can include an outer surface 78 defining an outer diameter 80, as well as a second portion 82 of a threaded fastener. In the illustrated embodiment, the engagement protrusion 32 includes a lower plate member 84 with an aperture 86. The aperture 86 can include threads, configured to engage the threads of the bolt 44. Optionally, the aperture 86 can include a tapered portion 88, having a wider end facing outwardly, so as to be oriented toward the bolt 44 in use. In other embodiments, a nut (not shown) can be secured over the aperture 86, for example, but without limitation, by welding, bonding, or other attachment techniques. In other embodiments, the bolt 44 can be mounted to the protrusion 32 and a nut can be secured to the end wall 58 of the socket.

While certain embodiments have been presented in the foregoing detailed description, it should be appreciated that a vast number of variations exist. It should also be appreciated that the embodiments described herein are not intended to limit the scope, applicability, or configuration of the claimed subject matter in any way. Rather, the foregoing detailed description will provide those skilled in the art with a convenient road map for implementing the described embodiments. It should be understood that various changes can be made in the function and arrangement of elements without departing from the scope defined by the claims, which includes known equivalents and foreseeable equivalents at the time of filing this patent application.

What is claimed is:

1. A desk kit with removable legs configured for efficient packaging and shipping, the kit comprising:
   a desktop having an upper surface configured as a working surface for a user and a lower surface having at least first, second, third, and fourth recesses configured for receiving leg mount components;
   first, second, third and fourth leg mounts, each of the first, second, third and fourth leg mounts comprising:
   an end wall portion fixed relative to the lower surface of the desktop;
   a cylindrical inner sidewall extending from the end wall portion, wherein the end wall portion and the cylindrical inner sidewall form a leg mounting socket;
   first, second, third and fourth threaded fastener portions coupled at the end wall portions of the first, second, third and fourth leg mounts, respectively;
   first, second, third and fourth legs attached to the first, second, third and fourth leg mounts, respectively, each of the first, second, third and fourth legs comprising:
   a protruding portion having a cylindrical outer surface sized to provide a snug fit with the cylindrical inner sidewall;
   a distal end portion positioned at a distal end of the protruding portion;
   fifth, sixth, seventh, and eighth threaded fastener portions coupled to the distal end portions of the first, second, third and fourth legs, respectively;
   wherein either the first, second, third and fourth threaded fastener portions are coupled at the end wall portions of the first, second, third and fourth leg mounts with sufficient clearances to allow the first, second, third and fourth threaded fastener portions to move over limited ranges of radial and/or axial movement during installation to improve alignability of the first, second, third and fourth threaded fastener portions with the fifth, sixth, seventh, and eighth threaded fastener portions, or the fifth, sixth, seventh, and eighth threaded fastener portions are coupled to the distal end portions of the first, second, third and fourth legs with sufficient clearances to allow the fifth, sixth, seventh, and eighth threaded fastener portions to move over limited ranges of radial and/or axial movement during installation to improve alignability of the first, second, third and fourth threaded fastener portions with the fifth, sixth, seventh, and eighth threaded fastener portions.

2. The desk kit according to claim 1, wherein each of the end wall portions comprises a flange portion having a mounting surface, a projection extending from beyond the mounting surface and into one of the first, second, third, and fourth recesses, a fastener aperture in the end wall portion, the fastener aperture comprising a plurality of inwardly facing flat surfaces configured for anti-rotation registration.

3. The desk kit according to claim 2, wherein first, second, third and fourth threaded fastener portions comprise bolts coupled with the first, second, third and fourth leg mounts, respectively, each of the bolts comprising a head, a shaft portion extending from the head, and a threaded portion extending from the shaft portion, the shaft portion comprising a plurality of outwardly facing flat surfaces configured to contact the inwardly facing flat surfaces and thereby engage the fastener aperture with anti-rotation registration, wherein the shaft portion is smaller than the fastener aperture so as to define a radial clearance between the shaft portion and the fastener aperture.

4. The desk kit according to claim 3, additionally comprising first, second, third and fourth retainer clips engaged with the bolts of the first, second, third and fourth threaded fastener portions, respectively, the retainer clips being engaged with the threaded portions thereby capturing the end wall portion between the heads and the retainer clips with axial clearance.

5. The desk kit according to claim 1, wherein each of the leg mounting sockets extend at an inclined angle relative to the lower surface of the desktop.

6. A table kit with removable legs, the kit comprising:
   a tabletop having an upper surface configured as a working surface for a user and a lower surface;
   at least a first leg mount connected to the lower surface of the tabletop comprising a socket portion having a cylindrical inner side surface, an inner end wall, and a first fastener portion coupled to the inner end wall with a first coupling;
   at least a first leg configured to be attachable to the first leg mount and comprising a protruding portion having a cylindrical outer surface portion, a distal end portion, and a second threaded fastener portion coupled to the distal end portion with a second coupling, the cylindrical outer surface portion being configured to form a fit with the cylindrical inner side surface;
   wherein at least one of the first and second couplings is sized so as to provide radial and/or axial clearance for and anti-rotation registration with the respective first or second threaded fastener portion, to allow the first or second threaded fastener portions to move over a limited range of radial and/or axial movement during engagement of the first and second threaded fastener portions during installation.

7. The table kit according to claim 6, wherein the socket portion extends at an inclined angle relative to the lower surface of the tabletop.

8. The table kit according to claim 6, wherein the lower surface comprises at least a first recess, and wherein the first leg mount comprises a projection extending into the first recesses.

9. The table kit according to claim 6, wherein the radial and/or axial clearances allow the first or second threaded fastener portions to move over limited ranges of radial and/or axial movement during installation to improve alignability of the first and second threaded fastener portions.

10. A furniture kit with removable legs, the kit comprising:
    a structural furniture member;
    at least a first leg mount attached to the structural furniture member, the first leg mount comprising a socket portion having a cylindrical inner side wall surface and an end wall positioned at an inner bottom end of the cylindrical inner side wall surface;
    at least a first fastener portion coupled with the leg mount; and
    at least a first leg comprising a protruding portion having a cylindrical outer side surface configured to fit within the cylindrical inner side wall surface, a distal end portion and a second fastener portion coupled with the distal end portion of the protruding portion and configured to engage the first fastener portion;

wherein at least one of the first and second fastener portions are coupled to the leg mount or protruding portion, respectively, with a clearance so as to allow a limited range of movement.

11. The furniture kit according to claim 10, wherein the socket portion extends at an inclined angle relative to a surface of the structural furniture member, and wherein the end wall is spaced from the surface of the structural furniture member, providing clearance between the first fastener portion and the surface of the structural furniture member to allow the first fastener portion to move during an alignment of the first fastener portion with the second fastener portion.

12. The furniture kit according to claim 11, wherein the clearance comprises radial and axial clearances sized to allow the first fastener portion to move over limited range of radial and/or axial movement relative to the end wall during installation to improve alignability of the first fastener portion and the second fastener portion.

13. The furniture kit according to claim 11, wherein the end wall comprises at least one inwardly facing flat surface configured for anti-rotation registration.

14. The furniture kit according to claim 13, wherein the first fastener portion comprises at least a first outwardly facing flat surface configured to contact the at least one inwardly facing flat surface and thereby engage the end wall with anti-rotation registration.

15. The furniture kit according to claim 10, wherein the structural furniture member comprises at least a first recess and wherein the first fastener portion comprises a head extending into the first recesses to provide clearance for the head to move during an alignment of the first fastener portion with the second fastener portion.

16. The furniture kit according to claim 10, wherein the structural furniture member comprises at least a first recess, and wherein the first leg mount comprises a projection extending from beyond the mounting surface and into the first recesses.

17. The furniture kit according to claim 10, additionally comprising a clip retaining the first fastener portion to the end wall.

18. The furniture kit according to claim 10, wherein the cylindrical outer side surface is sized to provide a snug fit with an cylindrical inner side wall of the socket portion.

19. The furniture kit according to claim 10, wherein the second fastener portion comprises a threaded aperture with a tapered aperture portion defining a tapered entrance to the threaded aperture.

20. The furniture kit according to claim 10, wherein the first fastener portion comprises a head, a shaft portion extending from the head, and a threaded portion extending from the shaft portion, the shaft portion configured to contact a fastener aperture in the end wall and rotatably restrict rotation of the shaft relative to the fastener aperture, wherein the shaft portion is smaller than the fastener aperture so as to define a clearance between the shaft portion and the fastener aperture.

* * * * *